United States Patent [19]

Fushimi et al.

[11] Patent Number: 4,551,267
[45] Date of Patent: Nov. 5, 1985

[54] ELECTRICALLY CONDUCTIVE PLASTIC COMPLEX MATERIAL

[75] Inventors: Kazuo Fushimi, Kawaguchi; Hirokazu Tsunakawa, Saitama; Kunio Yonahara, Yokohama, all of Japan

[73] Assignee: Kabushiki Kaisha Meidensha, Tokyo, Japan

[21] Appl. No.: 574,160

[22] Filed: Jan. 26, 1984

[30] Foreign Application Priority Data

Jan. 27, 1983 [JP] Japan ................................. 58-10572

[51] Int. Cl.$^4$ .............................................. H01B 1/06
[52] U.S. Cl. ................................. 252/511; 252/182.1; 429/42; 429/212
[58] Field of Search ................ 252/502, 511, 182.1; 524/495, 496; 429/101, 42, 212, 50

[56] References Cited

U.S. PATENT DOCUMENTS

| | | | |
|---|---|---|---|
| 3,389,200 | 6/1968 | Olstowski et al. | 252/502 |
| 4,183,988 | 1/1980 | Farrington et al. | 252/518 |
| 4,341,965 | 7/1982 | Okuo et al. | 252/504 |
| 4,386,019 | 5/1983 | Kaun et al. | 429/218 |

Primary Examiner—Josephine L. Barr
Attorney, Agent, or Firm—Fleit, Jacobson, Cohn & Price

[57] ABSTRACT

Described is an electrode formed from a composition consisting essentially of a base resin polymer, carbon black and graphite, with adsorptive active carbon added thereto. The electrode is capable of suppressing halogen diffusion in the metal-halogen battery for improving its energy efficiency.

4 Claims, 3 Drawing Figures

ELECTRICALLY CONDUCTIVE PLASTIC COMPLEX MATERIAL

BACKGROUND OF THE INVENTION

This invention relates to an electrically conducting plastic complex material and, more particularly to such electrically conductive plastic complex material suitably used in a metal-halogen batteries in which metal-halogen is used an active material.

In recent years, the necessity for more effective energy utilization has led to development of a novel type battery making use of metal-halogen as active material. An example of such metal-halogen battery is shown in FIG. 1 which shows in exploded perspective the laminated or stacked structure of the metal-halogen secondary battery through which the electrolyte is circulated.

In FIG. 1, electrodes 1 of the bipolar type and separators 2 are stacked as shown and clamped on both sides by aluminium clamping end plates 11. The stack of these electrodes and separators are united together by bolts 12 and nuts 13. The electrolyte is supplied from a manifold 14 through a channel 15 and a microchannel 19 to the electrode surface and kept in circulation by means not shown. In the drawing, the numeral 16 designates a plastic clamping end plate, the numeral 17 an electrode and plate and the numeral 18 a terminal comprised of a wire net.

The aforementioned metal-halogen battery makes use of monovalent alkali metals such as Li, Na or K or divalent metals such as Zn, Cd, Ni, Co or Fe as metals, Cl, Br or I as halogen and aqueous or nonaqueous solutions as electrolyte. So far, the electrodes comprising a mixture of a synthetic resin material and electrically conductive substances such as metal powders or carbon powders have been used in connection with the aforementioned metal-halogen batteries because these electrodes can be fabricated at lower costs into desired shape because of improved formability of the aforementioned mixture and are excellent in halogen durability. However, these electrodes are defective in that halogen difuse on long period usage from one towards the other side of the electrode, consequently self-discharge occurs and thus loses the function of storage batteries. Thus, when the halogen penetrates through the electrode, problems are caused such that (i) the outer battery casing is damaged by corrosive action; (ii) the energy efficiency of the battery is reduced in proportion to the penetrated halogen; (iii) above all, the bipolar type battery is subject to self-discharge due to halogen penetration; and (iv) the electrode may be degraded by halogen diffusion in the electrolyte.

SUMMARY OF THE INVENTION

This invention has been made in order to overcome the deficiency of the prior-art electrode which makes use of the metal-halogen as active material and electrodes made from carbon plastics.

It is an object of the present invention to provide an electrode made from carbon plastics material which it is difficult for halogen (active material) to pass through.

The present invention resides in an electrode for a metal-halogen battery characterized in that active carbon showing adsorptive properties are added to a composition consisting essentially of base resin polymer, carbon black and graphite and the resulting mixture is formed to the desired shape. One of high-density polyethylene, polypropylene and ethylene-propylene copolymer is used as a base synthetic resin material in the electrode.

Active carbon may be pulverulent or granular, and may be in the pelletized, crushed, granulated powder or spherical form, active with steam or chemicals.

DETAILED DESCRIPTION OF THE INVENTION

The present inventors conducted repeated researches into compositions of electrode materials capable of obviating the aforementioned deficiency accrued from use of the carbon-plastic electrodes in conjunction with metal-halogen batteries. It has emerged from these researches that the electrode formed by an electrically conductive plastic complex material comprised of a basic composition (carbon-plastic composition) consisting of the synthetic base resin material, carbon black and graphite and highly adsorptive active carbon operative to inhibit diffusion into electrode of the active material (halogen) is effective to drastically reduce halogen diffusion while also reducing an electrical resistivity of electrode as compared with the conventional carbon-plastic electrode and markedly improving the energy efficiency of the storage battery.

The novel electrode composed of the electrically conductive plastic complex material may be obtained by using active carbon as an adsorptive agent showing good adsorptivity and low electrical resistivity, adding 1 to 30 wt. percent of the active carbon into a carbon-plastic composition comprising a base synthetic resin material or matrix such as high-density polyethylene, normal chain type low-density polyethylene, polypropylene or ethylene-propylene copolymer, or another polyolefin, carbon black and graphite, and forming the mixture to a desired-shaped product. The composition is heated in a pressure kneader with an initial temperature of 180° C., kneaded thoroughly, pre-heated at 150° to 170° C. and formed to a desire-shaped electrode by using a heating press machine at a pressure of 100 kg/cm². The amount of the diffused halogen was measured with a device shown in FIG. 2. Thus it has been shown that the electrode comprised of active carbon and the aforementioned basic composition has superior properties to those of the electrodes consisting of the conventional carbon plastics.

Figure 1:
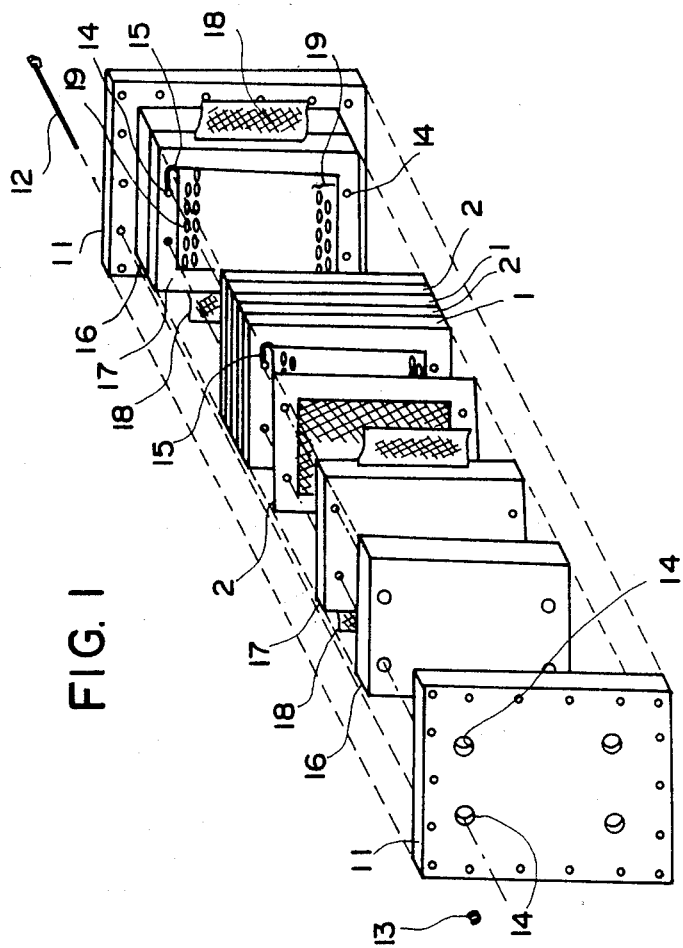
FIG. 1 is an exploded perspective view showing the stacked structure of the metal-halogen secondary battery with circulation of the electrolyte therethrough.
Figure 2:
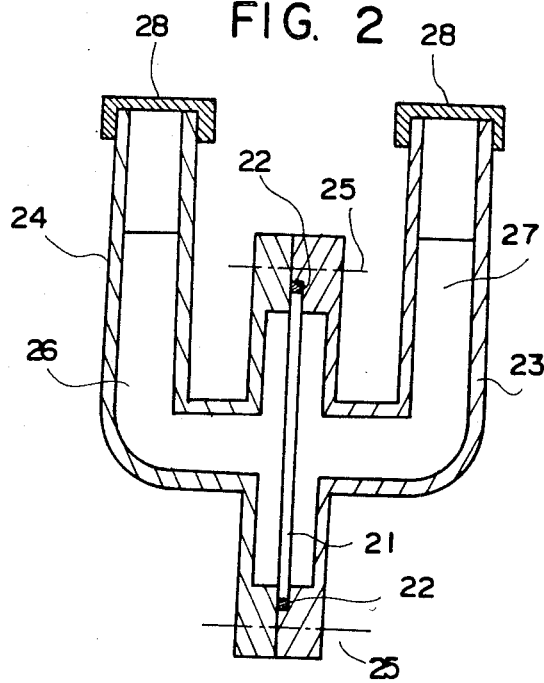
FIG. 2 is a diagrammatic view showing a unit for measuring bromine penetration.

Referring to the measurement unit shown in FIG. 2, the numeral 21 designates a disk-shaped sample sheet having a liquid contact surface 20 mm diameter and 1 mm thickness. The numeral 23 designates a vessel containing 25 ml of an electrolyte 27 containing no bromine (3 mol of ZnbR$_2$ per liter of aqueous solution), and the numeral 24 a vessel containing 25 ml of an electrolyte 26 containing bromine (3 mol of ZnBr$_2$ per liter and 3 mol of Br$_2$ liter of aqueous solution). The numeral 22 designates a packing, the numeral 25 a tightening bolt and the numeral 28 a cap adapted for preventing vaporization of the electrolyte.

In operation, the electrode sheet 21 is introduced into the vessel 23. The vessel 24 is tightened in a leakage free manner with the aid of the packing 22 and the tightening bolt 25. The electrolyte 26 containing bromine and the electrolyte 27 containing no bromine are introduced to the same level to eliminate the difference in liquid head. After lapse of a predetermined time, the amount of bromine ($Br_2$) diffused from the electrolyte 26 into the electrolyte 27 is measured with the aid of iodmetry.

As seen from the Examples No. 12 below, the inventive electrode made from electrically conductive plastic complex material comprised in turn of the carbon-plastic composition and active carbon shows a electrical resistivity equal to 0.1 to 0.11 ohm cm as electrode characteristics which represents about 60 percent of the resistivity for the conventional electrode comprised only of carbon-plastic material. The inventive electrode also showed a tensile strength equal to 370 to 375 kg/cm$^2$ which is higher about 25 percent than the value for the conventional electrode. When immersed for 500 hours in a 95%-bromine liquid at room temperature, the inventive electrode showed a reduction only 3 to 4 percent of total strength and an increase only 3 to 6 percent of resistivity. The inventive electrode also showed markedly reduced bromine diffusion as compared with the conventional electrode as shown in FIG. 4 which shows the data obtained by using the aforementioned measurement unit. The inventive electrode may therefore be used advantageously as electrode made from the complex material.

In consideration of the electrical conductivity of the electrode and the mechanical strength and workability, 1 to 30 wt. percent of active carbon is included in the composition as adsorbent. The amount of the graphite may be adjusted correspondingly. Active carbon may be pulverulent or granular, and may be in the pelletized, crushed, granulated powder or spherical form, activated with steam or chemicals.

The inventive electrode formed by electrically conductive plastic complex material added with active carbon has the following advantages.

(i) It is formed and composed of synthetic resin material, carbon black, graphite and active carbon and hence it is capable of suppressing diffusion of the halogen, such as bromine as active material. The result is the drastically improved energy efficiency of the storage battery.

(ii) Diffusion of the halogen (such as bromine) through the electrode is reduced so that the electrode plate is free from its aggressive action resulting in long life time of the electrode.

(iii) The effect discussed in item (ii) may also be obtained with the end electrode plate and the outer battery casing.

(iv) The inventive material may be manufactured at reduced costs and used advantageously not only with the metal-halogen battery such as bromine-zinc of chlorinezinc battery but with other batteries making use of electrodes made from electrically conductive plastic complex material or electrodes designed used for with electrochemical reactions.

The present invention will be described further by referring to the Examples below.

EXAMPLE

High-density polyethylene was used as base synthetic resin material (A) to which were added carbon black (B) and graphite (C) to provide a basic composition to which was added pulverulent active carbon to provide the composition shown in Table 1. This electrode composition was kneaded thoroughly in a pressure kneader at an initial temperature of 180° C. and for 3 minutes at 60 rpm, and then kneaded for 12 minutes at 90 rpm. The kneaded material was clamped between heat press mold halves, pre-heated at 150° to 170° C. for 5 minutes, than pressed for 5 minutes at 100 kg/cm$^2$ to an electrode sheet 1 mm thick.

TABLE 1

| | Electrode Composition | | | | |
|---|---|---|---|---|---|
| | Electrode Composition (wt. %) | | | | |
| | basic composition | | | | |
| Test No. | *1 synthetic resin material A | *2 composition carbon black B | *3 graphite C | active carbon | kind of active carbon |
| Ex. (1) | 50 | 20 | 20 | 10 | powdered active carbon Shirasagi A (manuf. by Takeda Yakuhin Kogyo K.K.) |
| Ex. (2) | 50 | 20 | 20 | 10 | powdered active carbon Shirasagi M. (manuf. by Takeda Yakuhin Kogyo K.K.) |
| Ex. (3) | 50 | 20 | 20 | 10 | powdered active carbon Carbo-Raffin (manuf. by Takeda Yakuhin Kogyo K.K.) |
| Comp. Ex. (4) | 50 | 20 | 30 | — | |

*1 Polyethylene; density 0.963 g/cm$^2$, melting point 132° C.; MFR 5.3 g/10 min. (maker: Chisso K.K., M850)
*2 Carbon black; Ketchen Black EC (Lion Acso)
*3 Graphite; G-200 under (Tokai Carbon)

Figure 3:
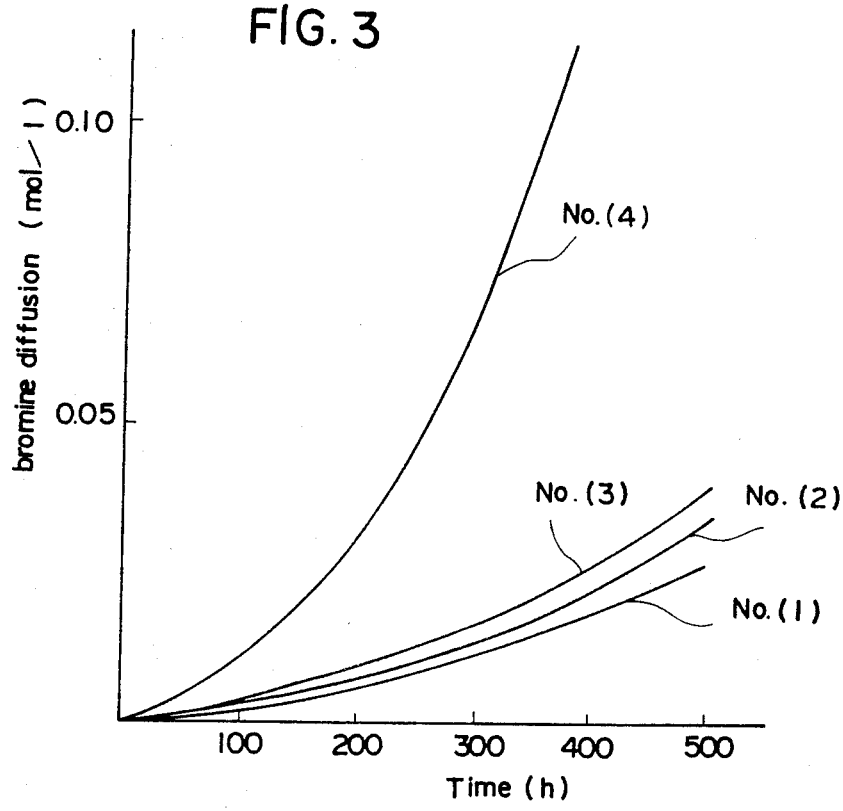
FIG. 3 is a graphic chart showing the bromine penetration with time lapse through the plastic electrodes as confirmed by the Examples.

The electrode thus obtained may be used in a bromine-zinc battery as typical of the secondary battery and diffusion of bromine as its active material was measured with the test piece of electrode by the device shown in FIG. 2 in the manner described above. The results are shown in FIG. 3.

It is seen form this figure that bromine diffusion differed markedly depending on whether active carbon has been added or not and that bromine diffusion is lowest with Shirasagi A No. (1), and proceeds through a medium value with Shirasagi M. No. (2) to a maximum value with Carbo-Raffin No. (3).

Next, electrode test samples No. (1)–(3) and No. (4) were immersed in 95% bromine solution for 500 hours at room temperature and changes causes in tensile strength and volume resistivity were measured. The results are shown in Table 2 below.

TABLE 2

| | Electrode Characteristics | | | | | |
|---|---|---|---|---|---|---|
| | Tensile Strength (kg/cm$^2$) | | | volume resistivity (Ωcm) | | |
| Test No. | initial | after 500 hrs | reduction rate (%) | initial | after 500 hrs | increase rate (%) |
| Ex. (1) | 375 | 363 | 3.2 | 0.105 | 0.109 | 3.8 |
| Ex. (2) | 373 | 361 | 3.2 | 0.106 | 0.110 | 3.8 |
| Ex. (3) | 375 | 360 | 4.0 | 0.105 | 0.111 | 5.7 |
| Comp. Ex. (4) | 300 | 257 | 14.3 | 0.174 | 0.200 | 14.9 |

As shown in Table 2, the electrode added with active carbon differs markedly in the tensile strength reduction rate and volume resistivity increase rate from the electrode not added with active coal. In addition, the electrode added with active carbon has a higher tensile strength and a lower volume resistivity characteristic of high-quality electrodes.

What is claimed is:

1. An electrically conductive plastic complex material for use as a halogen battery electrode, said complex material comprising base resin polymer, carbon black and graphite, said base resin polymer being selected from the group consisting of polyethylene, polypropylene and ethylene-propylene copolymer, wherein said material comprises 50 weight percent of said base resin polymer and 20 weight percent of said carbon black, and wherein a part of said graphite is substituted by adsorptive active carbon in order to control halogen diffusion through the electrode, said adsorptive active carbon being in the range of 1 to 30 weight percent of said material.

2. An electrically conductive plastic complex material according to claim 1, wherein said active carbon is a powder selected from the group consisting of pulverulent, granulated or crushed powder or spherical carbon and wherein said active carbon is activated with chemicals or steam.

3. An electrically conductive plastic complex material according to claim 1, wherein said metal halogen battery electrode is a zinc-bromide battery electrode.

4. The electrically conductive plastic complex material according to claim 1, wherein the base resin polymer, carbon black, graphite and adsorptive active carbon have a weight ratio of about 50:20:20:10.

* * * * *